US008209407B2

(12) United States Patent
Warner et al.

(10) Patent No.: US 8,209,407 B2
(45) Date of Patent: Jun. 26, 2012

(54) SYSTEM AND METHOD FOR WEB SERVICE DISCOVERY AND ACCESS

(75) Inventors: Elizabeth Warner, Covington, LA (US); Roy Ladner, Slidell, LA (US); Kalyan Gupta, Springfield, VA (US); Frederick E Petry, New Orleans, LA (US); David W Aha, Annapolis, MD (US); Philip G Moore, Laurel, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 1161 days.

(21) Appl. No.: 11/673,006

(22) Filed: Feb. 9, 2007

(65) Prior Publication Data
US 2008/0040510 A1 Feb. 14, 2008

(51) Int. Cl.
*G06F 15/173* (2006.01)
*G06F 15/16* (2006.01)
(52) U.S. Cl. .................. 709/223; 709/217; 709/230
(58) Field of Classification Search .................. 709/223; 707/7, 102
See application file for complete search history.

(56) References Cited

U.S. PATENT DOCUMENTS

| 7,321,880 | B2* | 1/2008 | Gosby .............................. 706/20 |
| 2004/0030674 | A1* | 2/2004 | Nagano et al. .................... 707/1 |
| 2004/0054690 | A1* | 3/2004 | Hillerbrand et al. ....... 707/104.1 |
| 2004/0068586 | A1* | 4/2004 | Xie et al. ....................... 709/246 |
| 2004/0193635 | A1* | 9/2004 | Hsu et al. ....................... 707/102 |
| 2005/0021545 | A1* | 1/2005 | Lulich et al. .................. 707/100 |
| 2005/0187895 | A1* | 8/2005 | Paya et al. ......................... 707/1 |
| 2006/0206440 | A1* | 9/2006 | Anderson et al. .............. 705/500 |
| 2006/0212836 | A1* | 9/2006 | Khushraj et al. ............... 715/866 |
| 2006/0265352 | A1* | 11/2006 | Chen et al. ........................ 707/2 |

* cited by examiner

*Primary Examiner* — Yasin Barqadle
*Assistant Examiner* — Joe Chacko
(74) *Attorney, Agent, or Firm* — Amy L Ressing; Suresh Koshy; Kathleen Chapman

(57) ABSTRACT

An embodiment of the invention includes an apparatus, which includes a mediator operable to receive a user request and to transmit a user response; and a dynamic knowledge base including a web service classifier and a domain-relevant ontology. The mediator is operable to transform the user request into a web service request, using said dynamic knowledge base, and to transform a web service response into the user response, using the dynamic knowledge base. Optionally, the dynamic knowledge base includes a web service interface operation index. Optionally, the web service interface operation index includes an autonomous, dynamic web service interface operation index or a static web service interface operation index.

12 Claims, 5 Drawing Sheets

Dynamic Knowledge Base

| Conceptkey | WSDL Location | WSDL Method Name | Blank XML Message | XML to Ont. Map |
|---|---|---|---|---|
| SALINITY | http:// | getMapocData | <GridDataRequest><param>sal</param><areaOfInterest>... | Param:PARAMETER lowerLeftLon:WESTLONGITUDE |
| WS55 WSDL loc. | | fetchData | M3 | M3 |
| WS21 WSDL loc. | | retrieveMODAS | input XML | M2 |
| CRIT_DEP. WS3 WSDL loc. | | Some method name | M1 | M1 |
| WS2 WSDL loc. | | Some method name | M3 | M3 |
| WS4 WSDL loc. | | Some method name | M4 | M4 |

SYSTEM AND METHOD FOR WEB SERVICE DISCOVERY AND ACCESS

TECHNICAL ART

The invention relates generally to a computer network service broker, and more specifically to web services broker.

BACKGROUND ART

Web Services are becoming the technology used to share data in many domains. Web Services technologies provide access to discoverable, self-describing services that conform to common standards. Access and retrieval of data from heterogeneous sources in a distributed system such as the Internet pose many difficulties and require efficient means of discovery, mediation and transformation of requests and responses. Differences in schema and terminology prevent simple querying and retrieval of data. These functions require processes that enable identification of appropriate services, selection of a service provider of requested data, transformation of requests/responses, and invocation of the service interface. Service availability must also be resolved. There have been a variety of approaches developed for these functions, but primarily independently of each other and not fully automated, i.e., often requiring human intervention.

Web Services provide data and services to users and applications over the Internet through a consistent set of standards and protocols. Commonly used standards and protocols include, but are not necessarily limited to, the Extensible Markup Language (XML), Simple Object Access Protocol (SOAP), the Web Services Definition Language (WSDL) and Universal Discovery Description and Integration (UDDI).

XML is a language used to define data in a platform and programming language independent manner. XML has become one of the widely used standards in interoperable exchange of data on the Internet but does not define the semantics of the data it describes. Instead, the semantics of an XML document are defined by the applications that process them, XML Schemas define the structure or building blocks of an XML document. Some of these structures include the elements and attributes, the hierarchy and number of occurrences of elements, and data types, among others.

WSDL allows the creation of XML documents that define the "contract" for a web service. The "contract" details the acceptable requests that will be honored by the web service and the types of responses that will be generated. The "contract" also defines the XML messaging mechanism of the service. The messaging mechanism, for example, may be specified as SOAP. A web service describes its interface with a WSDL file and may be registered in a registry such as UDDI. Interfaces defined in XML often identify SOAP as the required XML messaging protocol. SOAP allows for the exchange of information between computers regardless of platform or language. A registry 10 provides a way for data providers 20 to advertise their Web Services and for consumers 30 to find data providers 20 and desired services, for example, as shown in FIG. 1. A data provider 20 of a Web Service publishes a description of the Web Service in a registry 10. A Web Service user or consumer 30 discovers and retrieves the description from the Web Service from the registry 10. The Web Service user 30 then invokes the Web Service. The Web Service sends the Web Service User 30 a response to the user's invocation.

DISCLOSURE OF THE INVENTION

An embodiment of the invention includes an apparatus, which includes a mediator operable to receive a user request and to transmit a user response; and a dynamic knowledge base including a web service classifier and a domain-relevant ontology. The mediator is operable to transform the user request into a web service request, using said dynamic knowledge base, and to transform a web service response into the user response, using the dynamic knowledge base. Optionally, the dynamic knowledge base includes a web service interface operation index. Optionally, the web service interface operation index includes an autonomous, dynamic web service interface operation index or a static web service interface operation index.

Optionally, the apparatus further includes a patroller operable to search at least one of a web service registry and the internet or an intranet for a web service, the web service including a web service interface specification and an operation, the web service interface specification including a network location, the operation including an operation name, the operation generating operational data, the operational data including an optional data specialization. The patroller is operable to transmit the web service interface specification to the web service classifier, the web service classifier including a first classifier and a second classifier. The first classifier is operable to determine whether the web service interface specification is relevant to a domain of interest, the second classifier being operable to determine whether the operation generates the operation data relevant to the domain of interest. The patroller is operable to identify a data term and an interface term for the operation. The patroller is operable to consult the ontology to identify an ontology concept corresponding to the data term and to identify an interface concept corresponding to the interface term. The patroller is operable to generate a map for a web service operation request. The map includes the interface concept and the interface term. The patroller is operable to store the operation name, the network location, the map, and the data concept in the autonomous, dynamic web service interface index.

Optionally, the web service classifier comprises a third classifier being operable to assign a label to the data specialization, said patroller being operable to store the data specialization in the autonomous, dynamic web service interface index.

Optionally, the patroller is operable to generate a web service operation request template at least in part from the web service interface specification.

Optionally, the patroller is operable to store the template in the autonomous, dynamic web service interface index.

Optionally, the patroller is operable to extract a unique identification from the web service interface specification, the unique identification comprising the network location, the operation name, and a web service name, said patroller being operable to store the unique identification in the autonomous, dynamic web service interface index.

Optionally, the map includes a path defining a location of the interface term relative to a root object of the web service operation request.

Optionally, tire mediator is operable to identify a user request term, a user request value, and a user request label from the user request. The mediator is operable to consult the ontology to identify a user request concept for the user request term. The mediator is operable to retrieve from the autonomous, dynamic web service interface index an indexed web service operation based on the user request concept and user request label. The mediator is operable to generate the web service operation request using the user request concept, the user request term, the user request value, and the map.

Optionally, the mediator is operable to identify a user request term, a user request value, and a user request label from the user request. The mediator is operable to consult the ontology to identify a user request concept for the user request term. The mediator is operable to retrieve from the autonomous, dynamic web service interface index an indexed web service operation based on the user request concept and user request label. The mediator is operable to generate the web service operation request using the user request concept, the user request term, the user request value, the map, and the web service operation request template.

Optionally, the mediator is operable to identify a web service response term, a web service response value, and a web service response label from the web service response. The mediator is operable to consult the ontology to identify a web service response concept for the web service response term. Tire mediator is operable to retrieve from the autonomous, dynamic web service interface index an indexed web service operation based on the web service response concept and web service response label. The mediator is operable to generate the user response using the web service response concept, the web service response term, the web service response value, and the map.

Optionally, the mediator is operable to transmit the web service request and to receive the web service response.

Optionally, the web service classifier includes at least one of a case-based reasoning classifier, a decision tree classifier, a support vector machine classifier, a linear regression classifier, a non-linear regression classifier, and a neural network classifier.

Another embodiment of the invention includes an apparatus that includes a mediator operable to receive a user request and to output a user response; and a dynamic knowledge base comprising a self-populating web-service interface index and a domain-relevant ontology. The mediator is operable to transform the user request into a web service request using the dynamic knowledge base, and to transform the web service response into the user response using said dynamic knowledge base. Optionally, the dynamic knowledge base comprises a web service classifier.

Another embodiment of the invention includes a method. A dynamic knowledge base comprising a web service classifier and a domain-relevant ontology is provided. A user request is received. The user request is transformed into a web service request using the dynamic knowledge base. A web service response is transformed into a user response using the dynamic knowledge base. The user response is transmitted. Optionally, the dynamic knowledge base includes an autonomous, dynamic web service interface operation index or a static web service interface operation index.

Another embodiment of the invention includes another method. A dynamic knowledge base comprising a self-populating web service interface index and a domain-relevant ontology is provided. A user request is received. The user request is transformed into a web service request using the dynamic knowledge base. A web service response is transformed into a user response using the dynamic knowledge base. The user response is transmitted. Optionally, the dynamic knowledge base comprises a web service classifier.

BRIEF DESCRIPTION OF THE DRAWINGS

FIG. 4 is a diagram of a database according to an embodiment of the invention.

DESCRIPTION OF PREFERRED
EMBODIMENTS OF THE INVENTION

Figure 1:
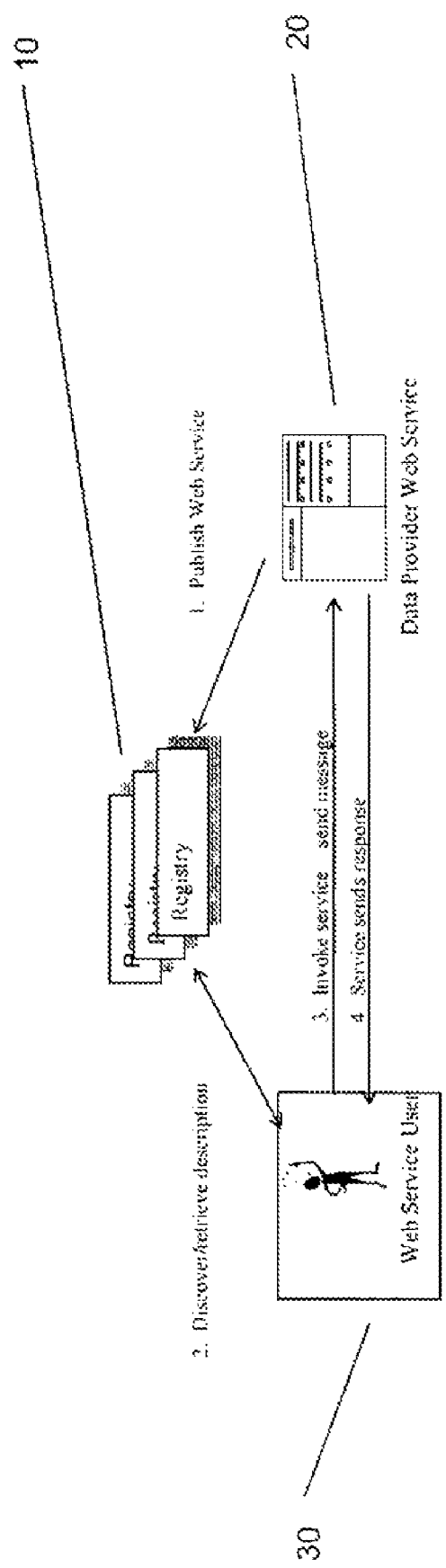
FIG. 1 is a block diagram of a user and computer network.
Figure 2:
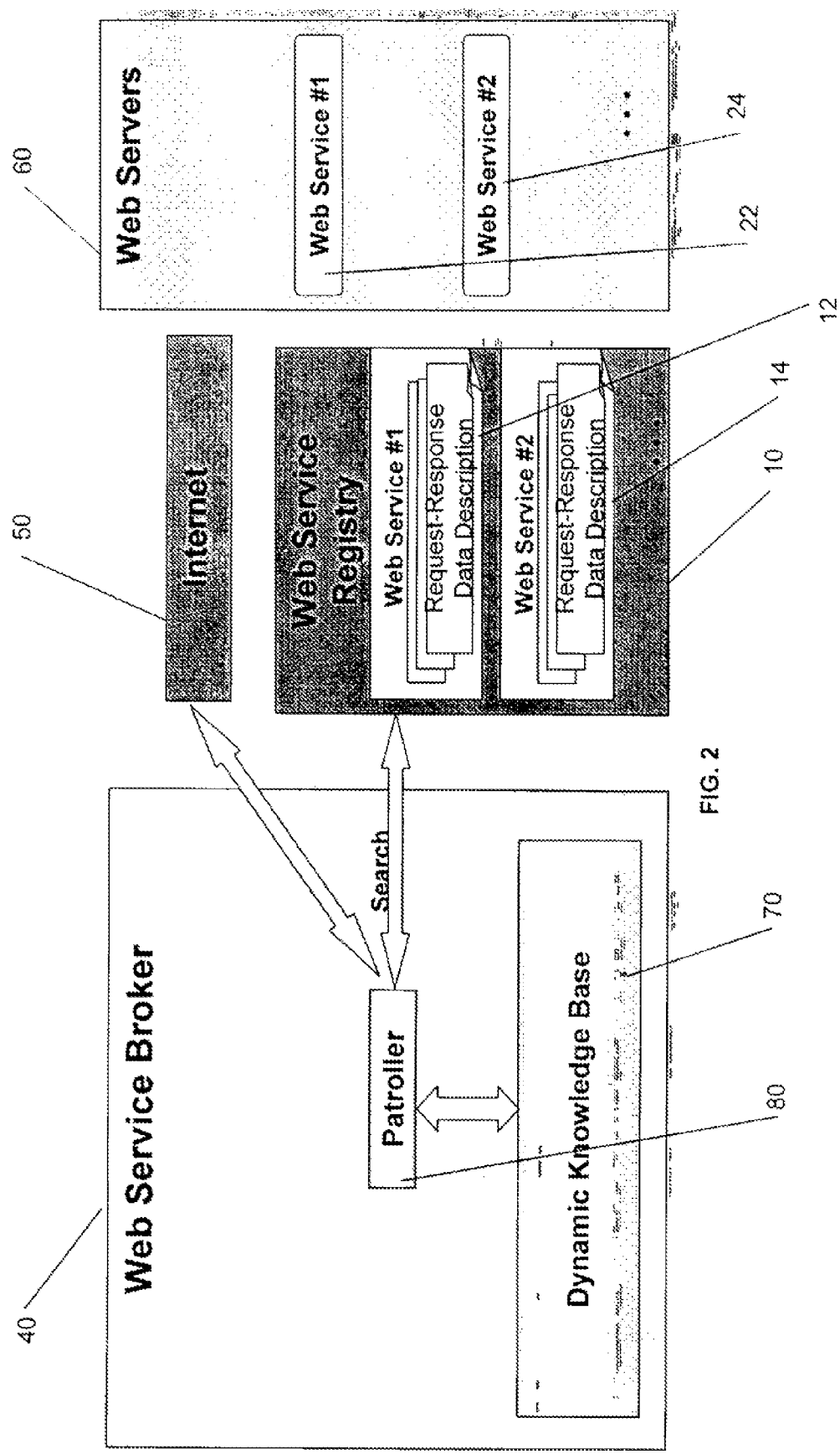
FIG. 2 is a block diagram of a web services broker according to an embodiment of the invention.

An embodiment of the invention is shown, by way of example, in FIG. 2 and is described as follows. A Web Services broker 40 according to an embodiment of the invention includes an integrated Web Services brokering system ("IWB"). An IWB 40, for instance, discovers one or domain-relevant Web Services #1, #2, etc. 22, 24, which may be on the same web server 60 or on multiple web servers and then dynamically transforms data requests and responses across them. Web Service domains include, for example, insurance domains, meteorological/oceanographic ("METOC") domains, banking domains, intelligence agency domains, geospatial domains, mapping domains, pathogen domains, stock market domains, and merchandise sales domains. (For the purpose of convenience, examples below will use the METOC Web Services domain, although it will be readily apparent that alternative domains are equally applicable). Relevant Web Services domains are then those domains of interest to a particular user or consumer. An optional illustrative IWB Web Services search and discovery function, is shown in FIG. 2. The IWB 40 will search the internet 50 and/or a variety of identified registries 10 for Web Services using the search feature supplied by that registry. The registries 10 include request-response data descriptions 12, 14 for each Web Service. This then enables the IWB 40 to readily locate candidate sources, i.e., web servers 60 hosting the desired web services to which requests may be brokered. Based on the characteristics of the Web Services it discovers, the IWB 40 optionally builds a knowledge base 70 to support mediation.

Figure 3:
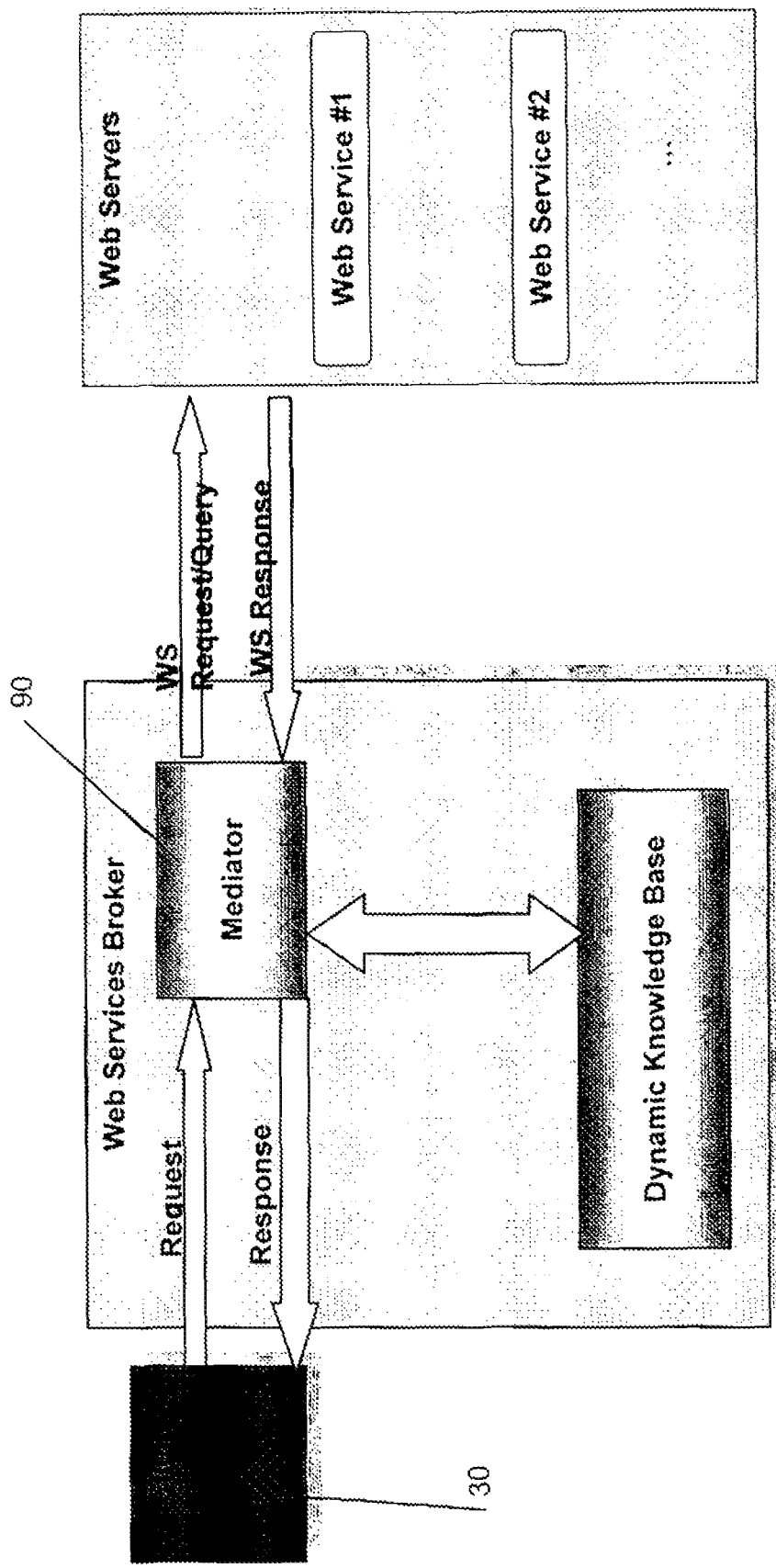
FIG. 3 is a block diagram of a web services broker according to an embodiment of the invention.

Knowledge base 70, for example, allows the IWB 40 to automatically translate user requests to differing Web Service interface specifications. The knowledge base 70 includes, for example, an ontology, a classifier, and/or an index. For example, knowledge base 70 assists with brokering requests to multiple Web Service data providers whose services may have implemented a) a community standard interface, b) an interface that is not a community standard, or c) an evolving version of a community standard interface. An optional, illustrative IWB mediation function is depicted in FIG. 3. The client request is dynamically translated and mediated to Web Services with differing WSDLs and/or Schemas.

IWB Processes

High level processes at work in the IWB 40 include, for example, Web Services discovery and mediation/transformation of user data requests.

Web Services Discovery

To prepare for the web service discovery process, the IWB 40 loads a functional ontology. The ontology allows IWB 40 to interpret terms found in WSDLs and schemas, as necessary, in order to build the knowledge base 70.

The actual search function of the IWB entails a capability to search specific registries. Relevant Web Services are discovered by the use of one or more classifiers. Use of classifiers is described, by way of a METOC domain example, as follows. First, the registry is queried to identify all registered Web Services. Then, a classifier is applied to distinguish METOC Web Services from non-METOC Web Services. A classifier is used to identity relevant data retrieval methods within the identified METOC Web Services. How the classification is utilized to discover relevant Web Services is discussed below on Classifier Approach. The search examines UDDI registries that may be applicable to this domain, as well as other known Web Services registries, such as xmethods and Binding Point. Relevant WSDLs and corresponding schemas of identified Web Services are then downloaded.

The next step is the processing of the discovered WSDLs. This step involves the examination of each newly discovered WSDL and recording particular information about the web service to enable mediation. The WSDL is decomposed into a symbol table of its contents so that available methods and their context (inputs, outputs, documentation, etc.) can be easily identified. Terms found in these methods and their context are used to identify those methods that are most likely to be MetOc data relevant. Following this is the creation of a blank XML message conforming to the required input of each of the identified methods. Finally, the structure of this XML message is mapped to ontology concepts. That is, for each term in the blank XML message, an appropriate concept, in the ontology to which it is related is identified. This, for example, permits the content of a client request to the IWB 40 to be mapped to the target blank XML structure.

Then, the IWB 40 adds the newly found web service to its knowledge base 70. The knowledge base 70, for instance, provides means of identifying Web Services that provide specific data and data types, and optionally it is updated every time the IWB 40 identifies a new web service or detects an update to a previously discovered web service. The records comprising the knowledge base are built, by way of METOC domain example, as follows. For each METOC parameter supplied by the identified WSDL data retrieval method, the following illustrative steps are performed. First, retrieve the concept related to the METOC parameter from the ontology. Second, complete the blank. XML template with the parameter name ("sal", "depth" etc.). For this, we associate the term used by the web service with the concept from the ontology. Third, create a web service method record. An illustrative Web Service Method record in the knowledge base includes, for example, a WSDL location, a Web Service method name, a blank XML message, and/or an XML to Ontology map.

A METOC domain example of the indexing for the knowledge base 75 is described as follows with reference to FIG. 4. The index key is the domain concept relevant to the parameters the web service provides. These parameters are identified from terms found in the web service's WSDL and schema. For example, a web service, which presides oceanographic data such as "sea salinity" as an enumerated parameter, would be indexed by the concept "salinity." Additional information for mediating user requests include, for example, each element/attribute that the schema identifies as mandatory, the SOAP Action & Service endpoint, the location for which data is provided, and/or the type of METOC data provided (such as grids, observational data, imagery, etc.).

Web Service Mediation

The IWB's mediation of user requests for data is described by way of illustration as follows. This mediation includes the transformation of user requests and Web Services responses. Illustrative steps include the following. First, receive an XML formatted user request for data. Second, decompose the user request to identify those XML tags that have associated values. Third, locate the tag that corresponds to a "parameter" synonym. This tag identifies the data request using the end-user's terminology. Fourth, query the ontology for the concept corresponding to the term provided by the user. Fifth, query the knowledge base by this concept to obtain all Web Services that provide data related to the concept. Sixth, transform the user's request to target web service's request structure.

When the request must be brokered to multiple Web Services, there are optionally multiple transformations. Such a step optionally utilizes the XML template recorded during the discovery process. This transformation is illustrated below, by way of the METOC domain example, with a request received by the IWB and the ensuing transformed request to be submitted to a web service.

An illustrative request, received by the IWB is as follows.

```
<GridRequest xmlns:xsl=http://www.w3.org/2001/XMLSchema-instance>
    <Parameter>salinity</Parameter>
    <aoi westLon="-80" southLat="10" eastLon="-70" northLat="20"/>
</GridRequest>
```

The above request is converted into the following transformed request:

```
<GridDataRequest xmlns =urn:nrl:metoc>
    <param>sal</param>
    <AreaOfInterest>
        <WestLongitude>=-80 <WestLongitude/>
        <SouthLatitude>=10 < SouthLatitude/>
        <EastLongitude>=-70 <EastLongitude/>
        <NorthLatitude>=20 <NorthLatitude/>
    <AreaOfInterest/>
</GridDataRequest>
```

Taking the METOC domain example further, a decomposed IWB request and a corresponding indexed web service request object to which the decomposed IWB request is converted is described illustratively as follows. Transformation of the server response proceeds in a similar manner.

An example of a decomposed user request is as follows:

| Concept | Request XML tag name | Request XML tag value | Attribute or Element |
| --- | --- | --- | --- |
| PARAMETER | Parameter | Salinity | Element |
| WESTLONGITUDE | westLon | −80 | Attribute |
| SOUTHLATITUDE | southLat | 10 | Attribute |
| EASTLONGITUDE | eastLon | −70 | Attribute |
| NORTHLONGITUDE | northLat | 20 | Attribute |

The decomposed user request is transformed into a web service request by matching concepts in the decomposed user request to concepts in the decomposed web service request, which includes an XML to Ontology map. A decomposed web service request follows:

| Concept | XML tag name | XML tag value | Attribute or element |
| --- | --- | --- | --- |
| PARAMETER | param | sal | element |
| WESTLONGITUDE | westLongitude | | element |
| SOUTHLATITUDE | southLatitude | | element |
| EASTLONGITUDE | easttLongitude | | element |
| NORTHLONGITUDE | northLat | | element |

IWB High Level Architecture

An embodiment of the inventive architecture that integrates the processes described above is described, by way of example, referring to FIGS. 2 and 3. FIG. 2 shows the architectural organization of the dynamic discovery; FIG. 3 illustrates how the dynamic mediation aspect of IWB is architecturally structured.

The IWB 40 includes a patroller 80. The patroller 80 searches computer networks, such as the Internet 50, and one or more Web Service registries 10 for request-response data descriptions or Web Service interlace specifications 12, 14, e.g., WSDLs and/or schemas, of domain-relevant Web Services 22, 24.

The IWB 40 can begin mediating user requests once its patroller 80 has discovered Web Services and begun populating the knowledge base 70. Specifically, the patroller 80 takes as input (1) discovered Web Services interface specifications 12, 14 and (2) the METOC ontology. It, for example, uses this information to build the knowledge base 70. It, for example, also assigns a qualitative and/or quantitative confidence score to each service. Such a confidence score is optionally used to rank Web Services. Alternatively, Web Services are ranked according to authoritative data source.

After the IWB 40 is initialized, it is ready to process user requests to the appropriate web service or multiple services. The IWB 40 includes a mediator 90 that provides the necessary transforms for this to occur. Clients 30 submit data requests to the mediator 90, for example, in an IWB XML format. The mediator 90 uses the previously created mappings to translate the client request into a candidate web service format specified in the WSDL and submits the request to the web service provider 60. As the recipient web service sends the data response back to the mediator 90, the mediator 90 transforms the web service response to the end-user format and forwards it to the IWB's Client 30. This is the inverse of the request mapping process.

Generative Sublanguage Ontologies System

The IWB 40 includes an ontology engine. The appropriate ontology engine is, for example, dependent on the application, but examples of ontology engines consistent with the instant invention include the Protege ontology engine that implements Frame description logic, the Jena engine for OWL-DL, and WordNet ontologies. Alternatively, an ontology engine is built using LISP or a knowledge representation language such as LOOM. Alternatively, an ontology engine is built using the CyC ontology.

An illustrative ontology development system for use with the IWB 40 according to an embodiment of the invention is, for example, based on Generative Sublanguage Ontologies ("GSO"), a type of linguistic ontology inspired by the Generative Lexicon Theory. These approaches provide a compact conceptual representation of related word meanings that can be used to robustly and accurately interpret natural language sentences. They also provide generative operators that can be used to select the correct meaning of a word from the possible alternatives for a given context. Their robustness arises from the ability to use these operators for situations where the words are used in creative and unanticipated ways.

GSOs are one of the first implementations of the Generative Lexicon Theory. The GSO Editor by ITT Industries, for example, is a graphical user interface that can be used to add, edit, and modify the ontology for a selected application domain such as IWB 40. It provides a user-friendly drag and drop interface and performs knowledge integrity checks during editing. For example, it prevents the user from specifying cyclic inheritance relations and prevents the user from deleting concepts that are used in the representation of others. It relieves the user of performing several representation consistency and completeness checks. These checks are performed by The GSO Engine by ITT Industries, for example, among its other functions. Host applications such as IWB access the application specific ontology via the GSO Engine interface, which is capable of responding to various queries from the host. For example, the following query is issued: "Get all concepts pertaining to the term salinity". The GSO Engine returns the corresponding GSO concept SALINITY, which states that it is a property of water and in particular seawater. In addition, the GSO Editor also provides various functions to compute synonymy and similarity computation across concepts that can be used for partial mapping. The ontology comprises two main components: the terms and their related concepts. The concepts are represented using the GSO representation approach, which, is a first order predicate calculus representation embedded in an object-oriented framework.

This is shown by illustrative oceanographic data design components as follows. The high level concept OCEAN is first shown, followed by the subconcepts SURFACE and SUBSURFACE.

OCEAN id: 1
Type_of: METOC
Terms: ocean(s)
Properties:
! METOC_PROPERTY(this, value)
SURFACE id: 2
Type_of: ENTITY
Terms: Surface(n)
Gloss: Surface of an object
Constituent: PART_WHOLE(whole:~OCEAN, part:~this)
SUBSURFACE id: 13
Type_of: ENTITY
Terms: Subsurface(n)
Gloss: An entity that is part of the ocean and located below the surface at a distance of X meters, X>0; X<?
Constituent: PART_WHOLE(whole:~OCEAN, part:~this)
LOCATED(~entity:this, refEntity: SURFACE, ~direction: BELOW, ~distance: X meters)

Next two properties. Salinity and Depth are illustrated. Concepts are shown in a rounded box with the name of the concept at the head of the box. Slot names are italicized and are in lower case. Two reserved symbols are "this" referring to the concept itself and "!", a GSO symbol showing that a slot is inherited from one of the ancestors. Arguments are referred by the aliases indicated by a tilde "~", like a variable name in an object. Terms are lower case non-italicized, comprising one or more words and or symbols. Terms have an associated part of speech such as, (v) indicating a verb, (n)—noun, (a)—adjective, etc.

SALINITY id. 29
Type_of: PROPERTY, PARAMETER
Terms: salinity(n), sal(n)
Gloss: Salinity of sea water
Argument structure:

| Argument Alias | Argument Type |
| --- | --- |
| ~object | SEAWATER |
| ~level | MEASURED_VALUE |

Behavior: METHOD(~returnedObject.?,this)
DEPTH id. 30
Type_of: PROPERTY, PARAMETER
Terms: depth(a), depth(n)
Gloss: Depth at which the observations are made Argument structure:

| Argument Alias | Argument Type |
|---|---|
| ~entity | ENTITY |
| ~entity'sTop | TOP(~entity) |
| ~depthLoc | ENTITYorBOTTOM(~entity) |
| ~deep | VALUE/NUMBER |

Behavior: LOCATED(~object, ~refObject:~entity's Top, ~direction: BELOW, ~distance:~deep)

METHOD(~returnedObject.?, this)

Discussion of the METOC Ontology

Figure 5:
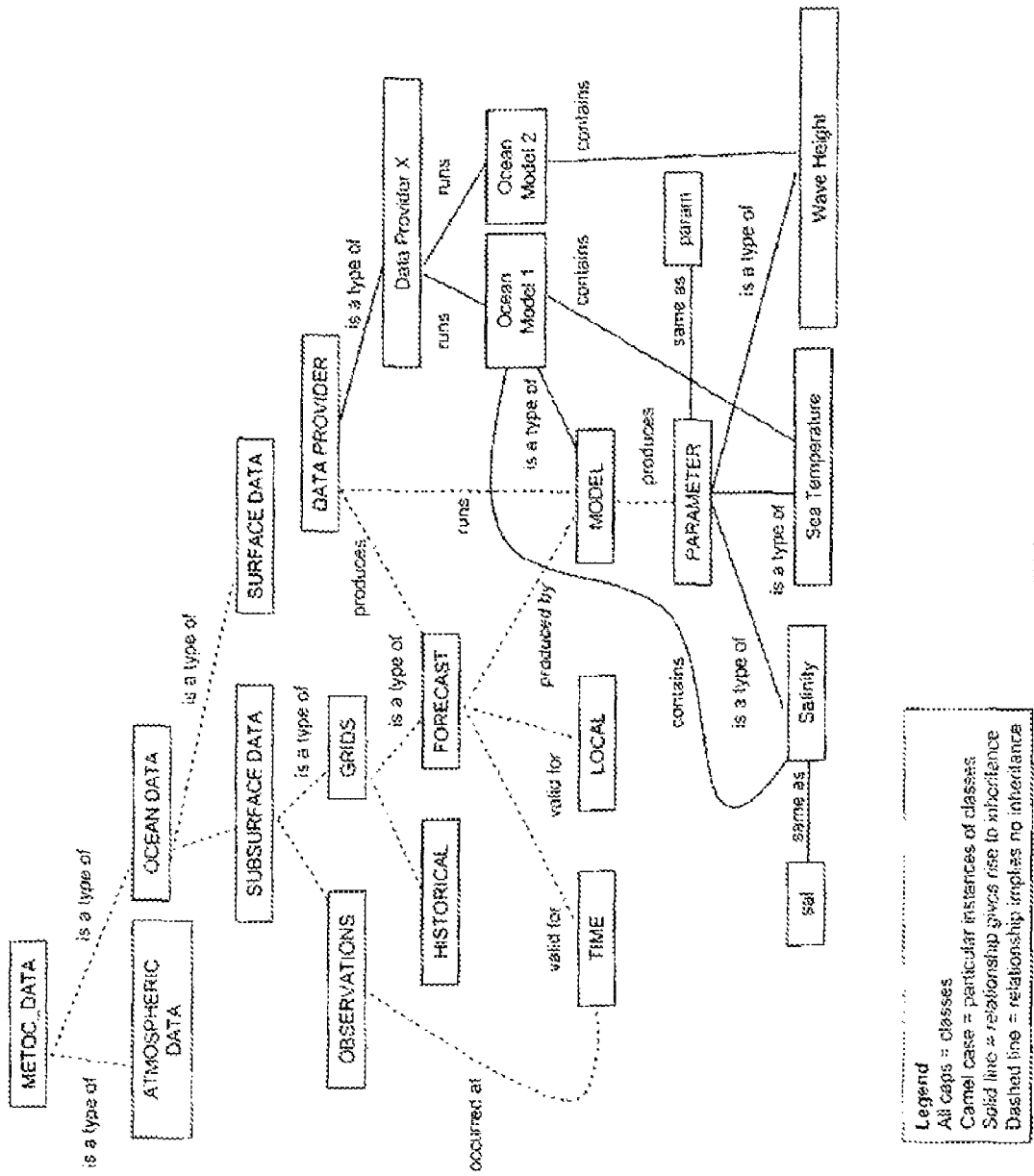
FIG. 5 is a portion of an ontology according to an embodiment of the invention.

An illustrative ontology in FIG. 5 captures a portion of both METOC domain terminology and potential data source terminology. Some of METOC terminology is quite general such as surface and subsurface and some very specific such as salinity. Other terminology provides the descriptions of the data formats such as grids or observations. For Web Service identification, it is optionally also useful or necessary to have data providers described along with the forecast models.

Because of the complexity in the development of domain ontologies, an embodiment of the invention, for example, includes case-based classification for some IWB tasks. Such case-based classification, for example, complements ontologies to support the automated discovery process for METOC Web Services. Case based reasoning ("CBR") is a problem-solving methodology that retrieves and reuses decisions from stored cases to solve new problems, and case-based classification focuses on applying CBR to supervised classification tasks.

Classifier Approach

Identifying whether a given web service supplies data for a particular domain is optionally framed as a classification or categorization task, which involves assigning one or more predefined labels to an unlabel led object. Thus, for example, the Web Services identification task for the METOC domain involves assigning the label "METOC" or "Non-METOC" to a given web service. An embodiment of the instant invention uses nearest-neighbor or cased-based classification. Other embodiments of the instant invention use alternative classification methodologies.

Overview of Classification Approaches

An embodiment of the invention includes automatically built classifiers from example data, often termed "supervised learning." The example data required for classifier learning is, for example, in a tabular format, where each row in the table is an object o and each column in table is an attribute a, as shown in the table below for Example Web Services data for classifier learning, O, for example, represents set of objects in the table and A, for example, represents the set of attributes (i.e., columns) in the table. Each cell in the table is the value $v_{ij}$ of the attribute for $a_j$ for a particular object $o_i$. The attributes are, for example, partitioned into two types: (1) Conditional attributes denoted by C, which are the object characteristics that provide information for classification and (2) Decision attribute(s) denoted by D, which are attributes whose values indicate the category that applies to an object.

Example Web Services Data for Classifier Learning

| | | Attributes-A | | | | | |
|---|---|---|---|---|---|---|---|
| | | Conditional Attributes-C | | | | | |
| | | $c_1$ (zip-code) | $c_2$ (temper-ature) | $c_3$ (water) | $c_4$ (price) | $c_5$ (get) | Decision Attribute-D d |
| O | $O_1$ | 3 | 2 | 1 | 0 | 1 | METOC |
| | $O_2$ | 1 | 0 | 0 | 2 | 3 | Non-METOC |
| | $O_3$ | 1 | 1 | 0 | 2 | 3 | Non-METOC |
| | $O_4$ | 2 | 1 | 4 | 1 | 4 | METOC |

Learning a classifier implies finding the function h that maps objects in O to decisions in D, that is, h: O→D. The methods for estimating or learning h depend on the family of functions under consideration. For example, linear and non-linear regression techniques, neural networks, decision tree learning, support vector machines, and/or nearest neighbor techniques are some of the methods used for building classifiers in accordance with the instant invention. Different classifiers have various strengths and weaknesses depending on the nature and the amount of example data. Typically, most classifiers are hard to develop when the data has a large number of attributes (in thousands), missing values, and only a few example objects (<100 per class). Many applications have such characteristics, especially those that deal with attributes that are textual in nature. Email classification and text categorization have attributes that run into 1000s. For such applications, case-based or nearest-neighbor classification approaches have been shown to be effective.

Case-Based Classification

Case-based classification according to an embodiment of the instant invention is described as follows. To classify a new object, the classification decision from previously classified objects is reused. Objects that have characteristics similar to the new object are called cases. Each object in the above table for Example Web Services data for classifier learning is an example of a case, and the list of objects in the table constitutes an example of the casebase. To assess the similarity of one case with another, the classifier uses a similarity metric or a matching function such as the Euclidean distance metric used as a similarity function. Alternative similarity metrics are consistent with other embodiments of the invention. The cases that are most similar to the unclassified object are called the nearest neighbors. The decisions from the k nearest neighbors from the case base are used in assigning the class label to a new object Training the classifier typically implies estimating the weights or parameters applicable to the similarity metric.

Web service classification in the MetOc application entails assigning one of the following two labels, "METOC" or "non-METOC", to a web service in question. The input to the classifier is a web service schema described using the WSDL and the output is an associated label. Prior to using the classifier, it is, for example, trained on example cases. An illustrative classifier training process as described as follows.

1. Case Preprocessing:

For classification, each WSDL and its associated schema must be converted into a case with attributes and values. The element contents in a schema are treated as a source of attributes. For example, an element in a schema may contain the text "waterTemperature." Alternatively, to reduce sparseness of cases, the element can be broken down by the tokenization process into constituent terms. So, "waterTemperature" is broken into "water" and "temperature." Subsequently, the morphotactic parsing process further reduces words into their baseforms. The word "producer" is reduced to its baseform "produce." This then has transformed the web service schema to a bag of unique baseforms. Each baseform is a potential case attribute and the frequency of its occurrence in a particular schema is the value corresponding to it. This is stored as a raw case in a preliminary case base. For each case, the decision of whether it is METOC or non-METOC is added as the decision attribute.

2. Attribute Selection:

With potentially hundreds of example web services for classifier training, it is possible to generate thousands of attributes. This is a serious computational challenge and can also adversely affect classification performance by introducing noisy and irrelevant attributes. For example, the attribute "http" may appear in all cases and provide no useful information to discriminate METOC from non-METOC web services. To counter this problem, optionally attribute selection is performed, wherein a metric is used to select a subset of attributes with a potential to improve classification performance. Attribute selection metrics such as mutual information, information gain, document frequency, and rough set methods are optionally used to select attributes. The information gain metric is optionally applied to select attributes in the Web Services Classifier.

3. Case Generation:

After the attributes have beers selected, each case must be indexed with the selected attributes and their corresponding weights must be computed. The information gain metric is used to calculate the weights applicable to the attributes. This outputs a classifier that includes the finalized cases and the similarity metric.

After training is complete, the classification of a new web service proceeds as follows. First, case preprocessing and case generation processes are used to convert the web service schema into a case. This case is matched with the cases in the case base using the learned similarity metric and the k-nearest neighbors are retrieved. The decision from the retrieved cases is then applied to the new case as follows. Each nearest neighbor votes on the decisions based on its classification. Each vote is weighted by the similarity of the voting neighbor. The classification label with the most votes is assigned as the decision to the new case. If the decision assigned to the new case is the same as expected, then it is counted as a correct classification or else a wrong classification. The classifier performance is measured by the percentage of cases classified correctly.

Because numerous modifications and variations of the above-described invention will occur to those of ordinary skill in the art it is not desired to limit the invention to the exact construction and operation illustrated and described. Accordingly, all suitable modifications and equivalents may be resorted to, falling within the scope of the invention.

What is claimed is:

1. A method comprising:
searching an internet by a patroller for web services, each of the web services comprising a web service interface specification and an operation, the web service interface specification comprising a network location, the operation comprising an operation name, the operation generating operational data, the operational data comprising a data specialization;
storing by the patroller the operation name in a self-populating web service interface index;
transmitting the web service interface specification by the patroller to a web service classifier, the web service classifier comprising a first classifier and a second classifier, the first classifier being operable to determine whether the web service interface specification is relevant to a domain of interest, the second classifier being operable to determine whether the operation generates the operation data relevant to a domain of interest;
providing a dynamic knowledge base comprising the web service classifier, a domain-relevant ontology, and the web service interface index, wherein the web service classifier, the domain-relevant ontology, and the web service interface index have no a priori knowledge of the web services;
receiving a user request by a computer-based mediator in electronic communications with a web server, the web server being electronically coupled with the web services;
identifying by the mediator a user request term, a user request value, and a user request label from the user request;
consulting the domain-relevant ontology by the mediator to identify a user request concept for the user request term;
retrieving by the mediator from the web service interface index an indexed web service operation based on the user request concept and the user request label;
generating a web service operation request by the mediator using the user request concept, the user request term, the user request value, a map for the web service operation request to translate the user request into a format for the web service operation request, and a web service operation request template, the web service operation request template being determined and recorded as the web services are discovered and stored in the dynamic knowledge base;
transmitting by the mediator the web service operation request to the web server;
receiving a web service response to the web service operation request;
transforming the web service response into a concept response based on the domain-relevant ontology;
transforming the concept response into a user response using the dynamic knowledge base; and
transmitting the user response.

2. The method according to claim 1, wherein the web service interface index comprises one of an autonomous, dynamic web service interface operation index and a static web service interface operation index.

3. The method according to claim 1, wherein said transforming the web service response into a user response using the dynamic knowledge base comprises:
identifying by the mediator a web service response term, a web service response value, and a web service response label from the web service response;
consulting the domain-relevant ontology by the mediator to identify a web service response concept for the web service response term;
retrieving from the web service interface index by the mediator an indexed web service operation based on the web service response concept and a web service response label; and
generating the user response by the mediator using the web service response concept, the web service response term, the web service response value, and the map.

4. The method according to claim 1, further comprising:
  identifying a data term and an interface term for the operation by the patroller;
  consulting the domain-relevant ontology by the patroller to identify an ontology concept corresponding to the data term and to identify an interface concept corresponding to the interface term;
  generating by the patroller the map, the map comprising the interface concept and the interface term; and
  storing by the patroller the network location, the map, and the interface concept in the web service interface index.

5. A method for receiving a user request and automatically providing a user response comprising:
  searching an internet by a patroller for web services, each of the web services comprising a web service interface specification and an operation, the web service interface specification comprising a network location, the operation comprising an operation name, the operation generating operational data, the operational data comprising a data specialization;
  storing by the patroller the operation name in a self-populating web service interface index;
  transmitting the web service interface specification by the patroller to a web service classifier, the web service classifier comprising a first classifier and a second classifier, the first classifier being operable to determine whether the web service interface specification is relevant to a domain of interest, the second classifier being operable to determine whether the operation generates the operation data relevant to a domain of interest;
  providing a dynamic knowledge base comprising the self-populating web service interface index and a domain-relevant ontology;
  receiving the user request by a computer-based mediator in electronic communications with a web server, the web server being electronically coupled with the web services;
  identifying by the mediator a user request term, a user request value, and a user request label from the user request;
  consulting the domain-relevant ontology by the mediator to identify a user request concept for the user request term;
  retrieving by the mediator from the web service interface index an indexed web service operation based on the user request concept and the user request label;
  generating a web service operation request by the mediator using the user request concept, the user request term, the user request value, a map for the web service operation request to translate the user request into a format for the web service operation request, and a web service operation request template;
  transmitting by the mediator the web service request to the web server;
  receiving a web service response to the web service operation request;
  transforming the web service response into the user response using the dynamic knowledge base; and
  transmitting the user response.

6. The method according to claim 5, wherein said dynamic knowledge base comprises the web service classifier.

7. The method according to claim 5, wherein the web service classifier comprises at least one of a case-based reasoning classifier, a decision tree classifier, a support vector machine classifier, a linear regression classifier, a non-linear regression classifier, and a neural network classifier.

8. The method according to claim 4, further comprising:
  generating by the patroller the web service operation request template at least in part from the web service interface specification; and
  storing by the patroller the web service operation request template in the web service interface index.

9. The method according to claim 5, wherein said transforming the web service response into a user response using the dynamic knowledge base comprises:
  identifying by the mediator a web service response term, a web service response value, and a web service response label from the web service response;
  consulting the domain-relevant ontology by the mediator to identify a web service response concept for the web service response term;
  retrieving from the web service interface index by the mediator an indexed web service operation based on the web service response concept and a web service response label; and
  generating the user response by the mediator using the web service response concept, the web service response term, the web service response value, and the map.

10. A method for transforming a user request into a web services request and transforming a web services response into a user response comprising:
  searching an internet by a patroller for at least one web service, the at least one web service including a web service interface specification and an operation, the operation including an operation name;
  storing by the patroller the operation name in a self-populating web service interface index;
  transmitting the web service interface specification by the patroller to a web service classifier, the web service classifier comprising a first classifier and a second classifier, the first classifier being operable to determine whether the web service interface specification is relevant to a domain of interest, the second classifier being operable to determine whether the operation generates operation data relevant to a domain of interest;
  automatically training the web service classifier to understand the at least one web service having relevance to a domain, the web service classifier
    (1) accessing a web service schema associated with the at least one web service,
    (2) estimating a similarity metric,
    (3) assessing the similarity between the at least one web service and existing web services based on the similarity metric and the web service schema, and
    (4) assigning a class label to the at least one web service based on a category that applies to the at least one web service;
  automatically building a knowledge base including the at least one web service and the class label;
  automatically receiving a data request;
  automatically accessing an ontology to determine a concept based on the data request;
  automatically retrieving from the web service interface index an indexed web service operation based on the data request;
  automatically querying, based on the data request and the concept, the at least one web service from the knowledge base;
  automatically receiving a response from the at least one web service;
  automatically translating the response into a concept response based on the knowledge base; and automatically translating the concept response into a client data response based on the ontology; and transmitting the client data response.

11. The method as in claim 10 wherein said step of querying further comprises the step of:

automatically translating the data request into a concept request based on an ontology of concepts.

12. The method as in claim 10 further comprising the step of:

automatically completing a template web service request based on the mapping for the at least one web service.

* * * * *